United States Patent [19]

Wang

[11] Patent Number: 5,593,124
[45] Date of Patent: Jan. 14, 1997

[54] ARTICLE HANGER

[76] Inventor: Chin-Yang Wang, No. 167, Lane 131, Sec. 2, Ture Hsing Rd., Panchiao City, Taipei Hsien, Taiwan

[21] Appl. No.: 540,946
[22] Filed: Oct. 11, 1995
[51] Int. Cl.⁶ .............................. F21L 15/08; B60R 7/00
[52] U.S. Cl. ................. 248/231.81; 248/225.11; 248/311.2; 224/483; 224/929
[58] Field of Search ......................... 248/231.81, 225.11, 248/228.7, 311.2; 224/483, 929

[56] References Cited

U.S. PATENT DOCUMENTS 4,724,986  2/1988  Kahn .................................... 224/483 X Primary Examiner—Leslie A. Braun
Assistant Examiner—Long Dinh Phan
Attorney, Agent, or Firm—Bucknam and Archer

[57] ABSTRACT

An article hanger including a base plate having a plurality of transverse slots at different elevations and a hanging member at a front side for holding things, each transverse slot having two pairs of vertically spaced tongues and an opening between the two pairs of vertically spaced tongues, a plurality of clamps coupled to the vertically spaced tongues, each clamp having a mounting rod at one end and a clamping plate at an opposite end for clamping on the louvers of an automobile's air conditioner, the mounting rod having a neck for coupling to one pair of vertically spaced tongues, and a plurality of stop rods respectively coupled to the pairs of vertically spaced tongues and stopped against the instrument board of the automobile, each stop rod having a plurality of necks for coupling to one pair of vertically spaced tongues.

9 Claims, 3 Drawing Sheets

ARTICLE HANGER

BACKGROUND OF THE INVENTION

The present invention relates to an article hanger designed for fastening to the louvers of an automobile's air conditioner for hanging things.

When driving a car, the driver may carry a lot of items in the car. For example, a car driver may use a mobile telephone or prepare a variety of beverage for drinking when driving the car. However, if disorderly put articles inside the car, these articles may fall here and therefore when the car vibrates.

SUMMARY OF THE INVENTION

The present invention has been accomplished to provide an article hanger which can be conveniently fastened to the louvers of an automobile's air conditioner for hanging things. According to the preferred embodiment of the present invention, the article hanger comprises a base plate having a plurality of transverse slots at different elevations, and a hanging member at a front side for holding things, each transverse slot comprising at least two pairs of vertically spaced tongues and an opening between each two pairs of vertically spaced tongues; a plurality of clamps respectively fastened to the pairs of vertically spaced tongues for clamping on the louvers of an automobile's air conditioner, each clamp comprising a mounting rod and a clamping plate coupled to the mounting rod for clamping on the louvers of the automobile's air conditioner, the mounting rod comprising a coupling hole at one end, which holds the clamping plate, a first outward flange at one end, a second outward flange disposed between the first outward flange and the coupling hole, and a neck connected between the first outward flange and the second outward flange, the size of the first and second outward flanges being slightly smaller than the opening of each transverse slot but bigger than the space between each pair of vertically spaced tongues, the diameter of the neck of the mounting rod being slightly smaller than the space between each pair of vertically spaced tongues, the length of the neck of the mounting rod being equal to the thickness of the vertically spaced tongues; and a plurality of stop rods respectively coupled to the pairs of vertically spaced tongues of the base plate and stopped against the instrument board of the automobile, each stop rod comprising a plurality of rod sections and a plurality of necks alternatively connected in a line, the diameter of the necks of the stop rods being slightly shorter than the space between each pair of vertically spaced tongues, the diameter of the rod sections being slightly smaller than the opening of each transverse slot but slightly longer than the space between each pair of vertically spaced tongues.

DETAILED DESCRIPTION OF THE PREFERRED EMBODIMENT

Figure 1:
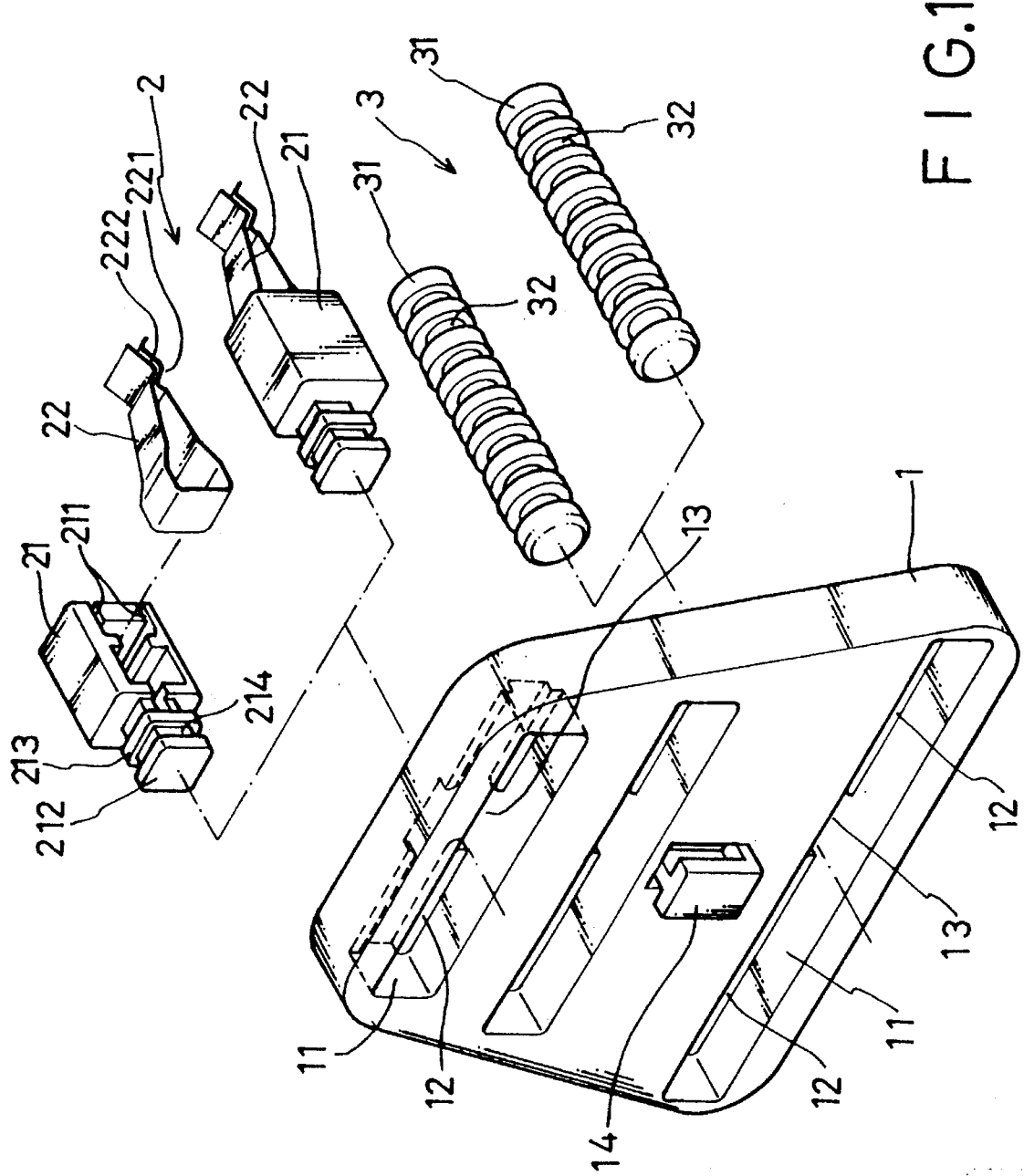
FIG. 1 is an exploded view of an article hanger according to the present invention.
Figure 2:
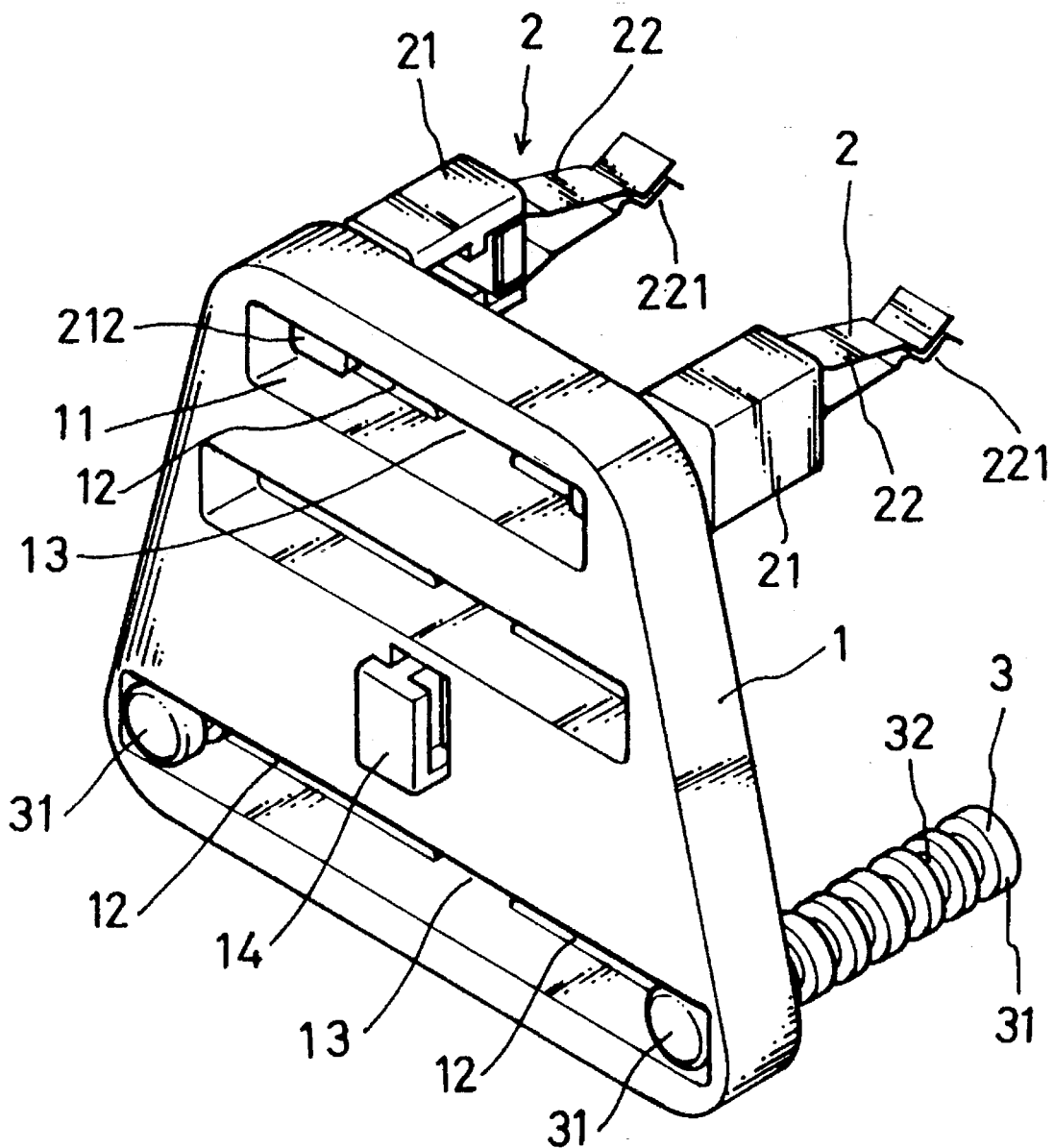
FIG. 2 is an elevational view of the article hanger shown in FIG. 1.

Referring to FIGS. 1 and 2, an article hanger in accordance with the present invention is generally comprised of a base plate 1 having a backward flange around the plate's border (FIG. 3), two clamps 2, and two stop rods 3. The base plate 1 is a solid plate having a plurality of transverse slots 11 at different elevations, pairs of vertically spaced tongues 12 respectively projecting into each transverse slot 11 at different elevations, a opening 13 at the center of each transverse slot 11, and a hanging member 14 raised from the front side thereof for holding things. The hanging member 14 can be a hook for hanging things, or a connector for mounting a mobile telephone holder. As an alternate form, the base plate 1 may have a backward flange around the border. Each of the clamps 2 comprises a mounting rod 21 and a clamping plate 22. The mounting rod 21 comprises a coupling hole 211 at one end, which holds the clamping plate 22, two outward flanges 212 and 213 disposed at an opposite end in a parallel relation and spaced by a rectangular neck 214. The width of the square neck 214 is slightly smaller than the distance between each two vertically spaced tongues 12 of each transverse slot 11. The height of the square neck 214 is longer than the height of the tongues 12. The size of the outward flanges 212 and 213 is slightly smaller than the opening 13 in each transverse slot 11. When the outward flange 212 is inserted into the opening 13 in one transverse slot 11, the neck 214 is moved into the space between the two vertically spaced tongues 12 in the respective transverse slot 11, and therefore the mounting rod 21 is fastened to the base plate 1. As an alternate form of the mounting rod 21, the outward flanges 212 and 213 and the neck 214 may be made of circular shape. The clamping plate 22 is made by bending a resilient, rigid plate into shape, permitting the two opposite ends 221 thereof attached to each other, and therefore a mouth 222 is defined between the two opposite ends 221 of the clamping plate 22. When the clamping plate 22 is fastened to the coupling hole 211 of the mounting rod 21, the mouth 222 is disposed outside the mounting rod 21 for fastening to the louvers of an automobile's air conditioner. Each of the stop rods 3 comprises a plurality of rod sections 31 and a plurality of necks 32 alternatively connected in a line. The diameter of the necks 32 is slightly shorter than the space between two vertically spaced tongues 12 of each transverse slot 11, however the diameter of the rod sections 31 is slightly longer than the space between two vertically spaced tongues 12 of each transverse slog 11. Each of the stop rods 3 can be conveniently fastened to the base plate 1 by inserting the elongated rod body 31 through the opening 13 in one transverse slot 11 and then moving the elongated rod body 31 sideways, permitting one annular groove 32 to be engaged with one pair of vertically spaced tongues 12 in the respective transverse slot 11.

Figure 3:
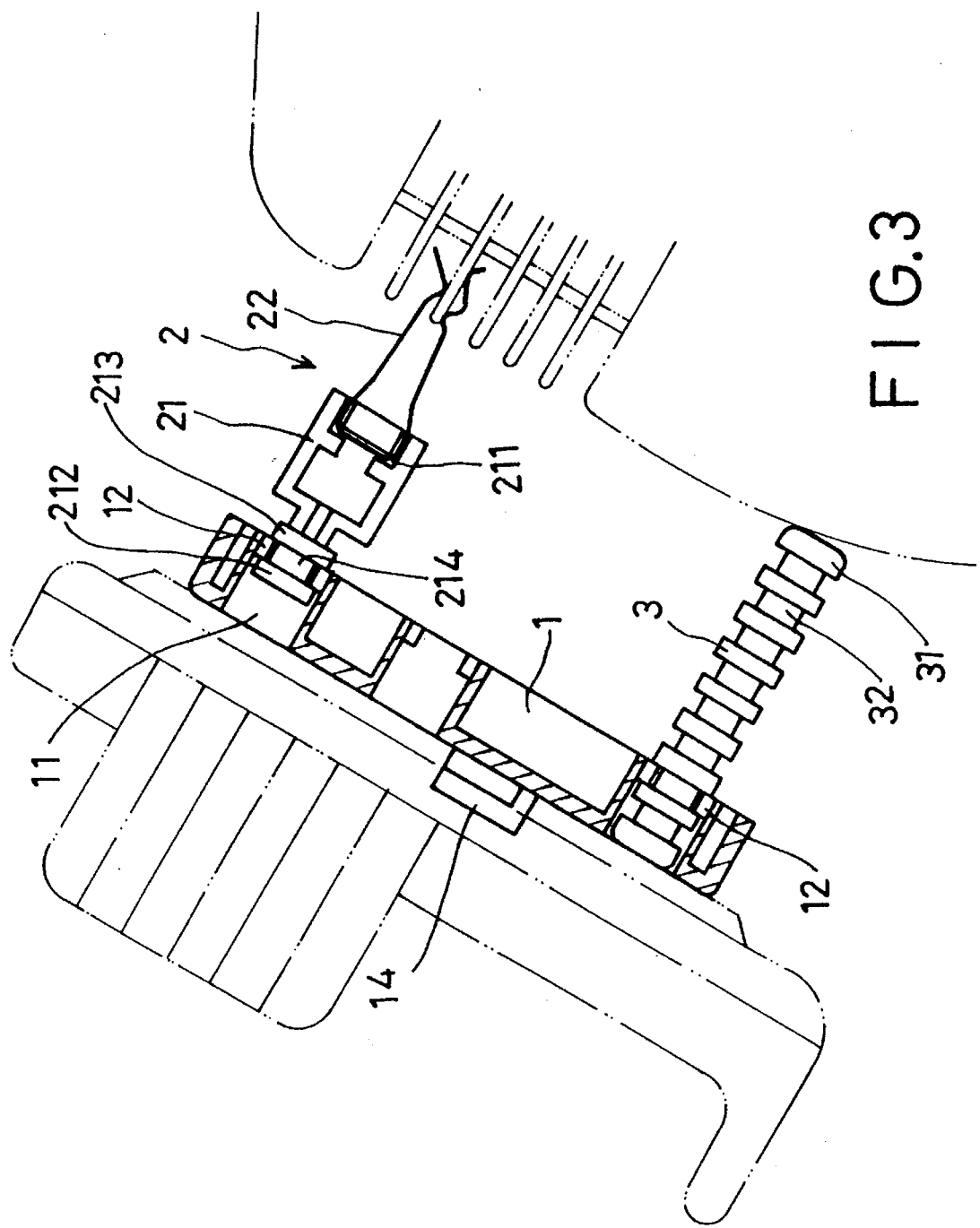
FIG. 3 shows the article hanger fastened to the louvers of an automobile's air conditioner.

Referring to FIG. 3, the mouth 222 of each clamp 2 is fastened to the louvers of the automobile's air conditioner (see the imaginary line), and the stop rods 3 are stopped against the instrument board of the automobile, and a mobile telephone holder can than be mounted on the hanging member 14.

It is to be understood that the drawings are designed for purposes of illustration only, and are not intended as a definition of the limits and scope of the invention disclosed.

I claim:

1. An article hanger comprising:

a base plate having a plurality of transverse slots at different elevations, and a hanging member at a front side for holding things, each transverse slot comprising at least two pairs of vertically spaced tongues and an opening between each two pairs of vertically spaced tongues;

a plurality of clamps respectively fastened to said pairs of vertically spaced tongues for clamping on the louvers of an automobile's air conditioner, each clamp comprising a mounting rod and a clamping plate coupled to said mounting rod for clamping on the louvers of the automobile's air conditioner, said mounting rod comprising a coupling hole at one end, which holds said clamping plate, a first outward flange at one end, a second outward flange dispose between said first outward flange and said coupling hole, and a neck connected between said first outward flange and said second outward flange, the size of said first and second outward flanges being slightly smaller than the opening of each transverse slot but bigger than the space between each pair of vertically spaced tongues, the diameter of the neck of said mounting rod being slightly smaller than the space between each pair of vertically spaced tongues, the length of the neck of said mounting rod being equal to the thickness of said vertically spaced tongues; and a plurality of stop rods respectively coupled to said pairs of vertically spaced tongues of said base plate and stopped against the instrument board of the automoible, each stop rod comprising a plurality of rod sections and a plurality of necks alternatively connected in a line, the diameter of the necks of said stop rods being slightly shorter than the space between each pair of vertically spaced tongues, the diameter of said rod sections being slightly smaller than the opening of each transverse slot but slightly longer than the space between each of vertically spaced tongues.

2. The article hanger of claim 1 wherein said base plate has a backward flange around the border.

3. The article hanger of claim 1 wherein the first outward flange of said mounting rod is made of rectangular shape.

4. The article hanger of claim 1 wherein the first outward flange of said mounting rod is made of circular shape.

5. The article hanger of claim 1 wherein the rod sections and necks of each of said stop rods are respectively made of circular shape.

6. The article hanger of claim 1 wherein the rod sections and necks of each of said stop rods are respectively made of rectangular shape.

7. The article hanger of claim 1 wherein said clamping plate is made from a curved plate having two opposite ends attached to each other with a mouth defined between.

8. The article hanger of claim 1 wherein said hanging member is a hook for hanging things.

9. The article hanger of claim 1 wherein said hanging member is a connector for mounting a mobile telephone holder.

* * * * *